United States Patent
Junes

[15] 3,643,642
[45] Feb. 22, 1972

[54] POWER TAKEOFF ON MARINE DIESEL ENGINE

[72] Inventor: Norman E. Junes, Route 3, Box 148, Astoria, Oreg. 97103

[22] Filed: July 6, 1970

[21] Appl. No.: 52,641

[52] U.S. Cl. ............................123/198 C, 64/10, 74/15.63, 123/195 A, 192/67 P
[51] Int. Cl. ..................F02b 77/00, F16d 11/04, F16d 3/48
[58] Field of Search ....................64/10; 74/15.6, 15.63; 123/195 A, 198 C; 192/67 R, 67 P; 418/69

[56] References Cited

UNITED STATES PATENTS

| | | | |
|---|---|---|---|
| 2,686,999 | 8/1954 | Smith | 192/67 R X |
| 575,620 | 1/1897 | Seymour | 192/67 R X |
| 2,202,455 | 5/1940 | Klavik | 123/195 A X |
| 3,435,778 | 4/1969 | Ascuitto et al. | 74/15.63 |
| 294,672 | 3/1884 | Proctor | 192/67 R X |
| 1,607,362 | 11/1926 | Powers | 64/10 X |
| 2,772,548 | 12/1956 | Covington, Jr. et al. | 64/10 X |
| 2,404,017 | 7/1946 | Wilkinson | 123/195 A X |
| 1,647,879 | 11/1927 | Miller | 197/67 R X |
| 3,424,287 | 1/1969 | Dreiding | 192/67 R X |
| 752,572 | 2/1904 | Macfarlane | 192/67 R X |
| 2,917,019 | 12/1959 | Krueger | 192/67 R |

Primary Examiner—Allan D. Herrmann
Attorney—Lee R. Schermerhorn

[57] ABSTRACT

A hydraulic pump is mounted as an accessory on a marine diesel engine to operate hydraulic equipment on a boat. The driving connection includes a double universal joint which eliminates side loading on the engine shaft which is utilized for driving the pump whereby the pump may be driven from one of the engine cam shafts. An intermediate member is resiliently mounted on a pair of axially spaced rubber O-rings on a driven hub member on the pump shaft. One end of the intermediate member is equipped with a circle of axial pins which fit loosely in a circle of holes in the hub member to provide one of the universal joints. A driving member bolted to the engine cam gear has a circle of axial pins which fit loosely in a circle of holes in the other end of the intermediate member to form a second universal joint. The hub member and intermediate member are mounted in a sleeve for axial sliding movement in a housing bolted to the engine housing. The pump is mounted on the sleeve. By sliding the pump and sleeve bodily toward the engine, the last named pins and holes cooperate as a dental clutch to drive the pump. By sliding the pump bodily away from the engine, the last named pins and holes are disengaged from each other to declutch the pump. This sliding movement is effected by a hand lever and a spring detent is provided to hold the clutch parts in engaged and disengaged positions.

7 Claims, 3 Drawing Figures

INVENTOR
NORMAN E. JUNES

POWER TAKEOFF ON MARINE DIESEL ENGINE

BACKGROUND OF THE INVENTION

This invention relates to a power takeoff on an engine and has particular reference to a power takeoff for a hydraulic pump on a marine diesel engine to operate hydraulic equipment on a boat.

Hydraulic power is commonly used to power salmon gurdies, tuna line pullers, crab fishing gears, anchor winches and many other devices on fishing boats. Pleasure boats also have need for hydraulic equipment.

Available power takeoffs for driving hydraulic pumps and the like are expensive in first cost and have various operational disadvantages. They are usually difficult to install and utilize belts and belt tighteners which give trouble and are frequently subject to failure. Also, the side loading imposed by a conventional belt drive limits the connection of such power takeoffs to shafts that are capable of withstanding the side loading and this makes the power takeoff installation objectionably cumbersome in the limited space usually available on a small boat.

Objects of the present invention are, therefore, a to provide an improved power takeoff for an engine, to provide a power takeoff especially adapted for mounting a hydraulic pump on a marine diesel engine, to provide a power takeoff which does not impose side loading on the pump shaft nor on the engine shaft which is utilized to furnish the power, to provide a power takeoff having a double universal joint and to provide a power takeoff in which the accessory device is moved bodily relative to the engine to clutch and declutch the device.

SUMMARY OF THE INVENTION

The present device may be driven safely from one of the cam shafts of a marine diesel engine. It may be mounted on either the right or left side utilizing available space above the reduction gear. In the illustrative embodiment, the power takeoff is associated with a hydraulic pump for operating hydraulic equipment on a boat.

An intermediate member is resiliently mounted on a special hub on the pump shaft by means of two axially spaced resilient O-rings. One end of the intermediate member has a circle of axial pins which enter loosely into a circle of holes in the hub member to provide one of the universal joints. A driving member bolted to the engine cam gear has a circle of axial pins which enter loosely into a circle of holes in the other end of the intermediate member to provide a second universal joint. These two universal joints cooperate to avoid side loading on the engine cam shaft and pump shaft.

The parts described above are contained in a sleeve which is bolted to the pump housing and has longitudinal sliding movement in a housing bolted to the engine housing. By sliding the pump and sleeve bodily toward or away from the engine, the last named pins and holes may be engaged with each other or disengaged to provide a dental clutch. A longitudinal guide pin on the sleeve prevents rotation of the sleeve and pump housing. Reciprocation is effected by a hand lever and depressions in the guide pin are engaged by a spring detent to hold the clutch either engaged or disengaged.

The invention will be better understood and additional objects and advantages will be apparent from the following description of the preferred embodiment illustrated on the accompanying drawing. Various changes may be made, however, in the details of construction and arrangement of parts and certain features may be used without others. All such modifications within the scope of the appended claims are included in the invention. The invention is not limited to use with a hydraulic pump nor is it limited to use with a marine diesel engine.

DESCRIPTION OF THE PREFERRED EMBODIMENT

Figure 1:
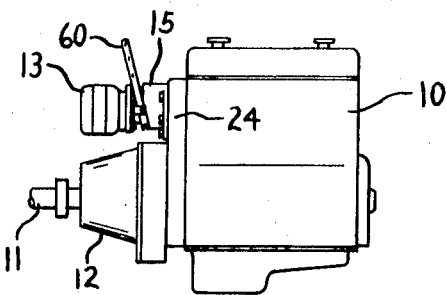
FIG. 1 is a side elevation view of a marine diesel engine equipped with a power takeoff embodying the invention.
Figure 2:
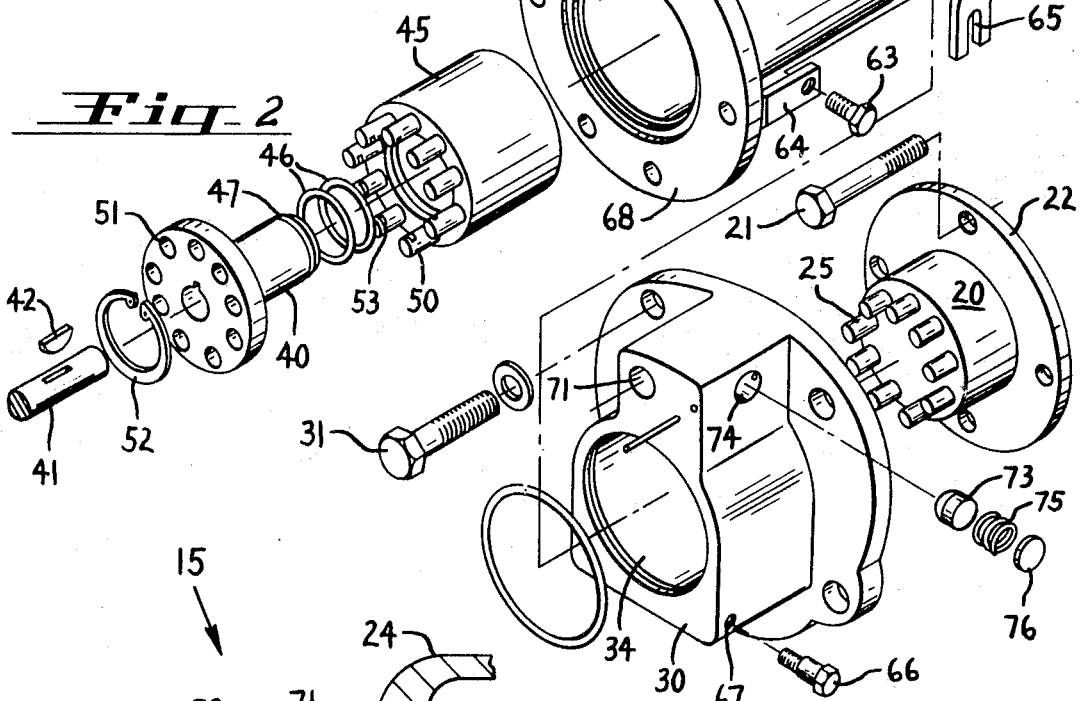
FIG. 2 is an exploded perspective view of the power takeoff.

In FIG. 1 the numeral 10 designates a common type of marine diesel engine which drives a propeller shaft 11 through a conventional reduction gear in reduction gear housing 12. A hydraulic pump 13 is mounted on the engine as an accessory by means of a power takeoff unit 15 embodying the invention.

Figure 3:
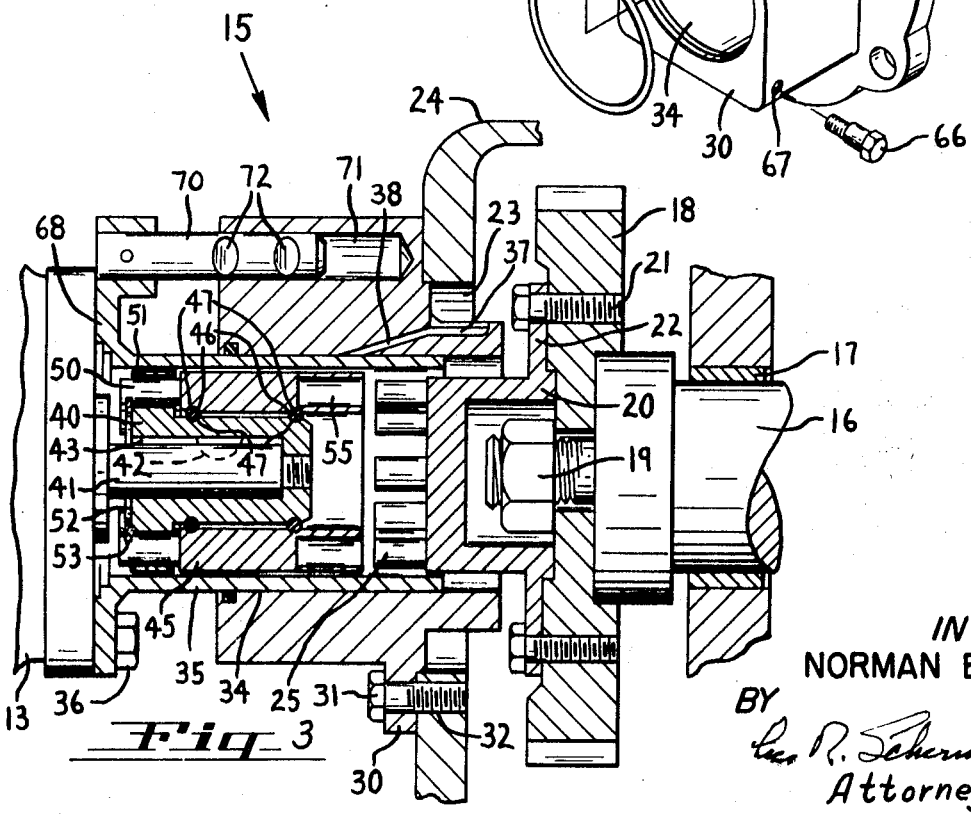
FIG. 3 is a longitudinal sectional view.

Above the reduction gear unit 12 the engine has a pair of camshafts as exemplified by the camshaft 16 in FIG. 3. Each camshaft is mounted in a rear bearing 17 which is not designed to withstand side loading whereby the camshaft cannot be utilized for driving conventional power takeoffs which impose a substantial side loading. The camshaft does, however, develop adequate torque beyond the needs of the engine for driving the hydraulic pump 13 without any objectionable wear and tear on the camshaft or other parts of the engine if side loading is avoided. Camshaft 16 is driven by a cam gear 18 which is fixedly mounted on the shaft and secured by nut 19. The present power takeoff does not require any alteration of the mounting of the gear on the shaft.

The power takeoff has a driving member 20 secured to gear 18 by capscrews 21 in a flange 22 of the driving member. Driving member 20 is readily insertable through an opening 23 in engine housing member 24 which is normally closed by a cover plate. In installing the power takeoff, the only alteration to the engine involves the removal of the cover plate from opening 23. Projecting rearward from the end of driving member 20 is a circle of axially directed, cylindrical dental clutch pins 25.

A support housing 30 is mounted on engine housing 24 by means of capscrews 31 which have threaded engagement in holes 32 about the opening 23 for the cover plate screws which were removed. Housing 30 contains a cylindrical bore 34 to receive a sleeve 35. The outer or rear end of sleeve 35 is secured to the end of pump housing 13 by screws 36. The sleeve is lubricated for sliding movement in bore 34 by means of a cup-shaped depression 37 which drains into bore 34 through a sloping passageway 38. Depression 37 operates as a sump to collect oil thrown up by the cam gear drive mechanism.

A hum member 40 is pressed on pump shaft 41 and drives the pump shaft through key 42 and spline groove 43. An annular intermediate member 45 is resiliently mounted on hub 40 by means of two axially spaced rubber O-rings 46 which are seated in confronting grooves 47 in the two members. The inside diameter of member 45 is larger than the outside diameter of hub member 40 to allow rocking movement of member 45 on the hub member.

Projecting rearward from annular member 45 is a circle of axially directed, cylindrical pins 50 which enter loosely into a circle of holes 51 in an end flange on hub member 40, the holes being slightly larger than the pins. Annular member 45 is secured to hum member 40 by a resilient retainer ring 52 engaged in notches 53 in the pins 50. Thus, the annular member 45 is free to shift and rock a short distance in all directions relative to hub member 40.

The forward end of annular member 45 contains a circle of axial holes 55 to receive the pins 25, the holes being slightly larger than the pins to permit relative movement in all directions between members 20 and 45. This clutch is engaged by moving the pump 13 bodily toward the engine 10 by means of lever 60. Lever 60 may be manipulated directly as a hand lever or it may be linked by means of holes 61 with a hand lever in a convenient position. Lever 60 is pivotally mounted on sleeve 35 by means of a hole 62 which provides pivotal support on a screw 63 in a bracket 64 on the flange 68 of the sleeve. A fulcrum for this movement is provided by a notch 65 in the lower end of the lever which straddles a screw 66 mounted in a hole 67 in housing 30.

Rotation of the sleeve 35 and pump housing 13 is prevented by a guide pin 70 which projects forward from the sleeve flange 68. Guide pin 70 slides in an axial bore 71 in housing 30 and contains a pair of spaced apart depressions 72 to receive a detent 73. Detent 73 is contained in a transverse bore 74 in housing 30 and is spring pressed against guide pin 70 by a compression spring 75 which is retainer in bore 74 by a threaded cap 76. The depressions 72 are positioned so that detent 73 will engage one of the depressions when the clutch is disengaged as shown in FIG. 3 and will engage the other depression when the sleeve 35 and driven member 45 are shifted forward to engage the pins 25 in holes 55.

The clutch will readily engage when the engine 10 is throttled down to slow speed. Since the pins 25 and holes 55 are distributed about the axis of rotation and since all of the pins enter the holes 55 simultaneously, the engaging of the clutch does not impose any side loading on camshaft 16 and, obviously, the driving of pump 13 after clutch engagement does not produce any side loading. Any lateral or angular misalignment between shafts 16 and 41 resulting from lack of precision in manufacture is readily accommodated by the double universal joint. The loose engagement of pins 25 in holes 55 constitutes a first universal joint and the loose engagement of pins 50 in holes 51 constitutes a second universal joint. Annular member 45 constitutes a flexible and resilient link or intermediate member between driving member 20 and the driven hub 40 which link prevents any possibility of side loading on camshaft 16 under any operating conditions.

What is claimed is:

1. A power takeoff for an engine comprising a housing adapted for mounting on an engine housing, a sleeve mounted for sliding movement in said first housing, means for mounting on said sleeve a unit of accessory equipment having a shaft, a hub on said shaft, an annular member resiliently mounted on said hub, a universal joint connection between said hub and one end of said annular member, a driving member adapted for connection with a camshaft gear in said engine, and a universal joint connection between said driving member and the opposite end of said annular member, sliding movement of said sleeve separating one of said universal joint connections to form a clutch for the power takeoff.

2. A power takeoff as defined in claim 1, each of said universal joint connections comprising a circle of axial pins loosely engaged in a circle of holes.

3. A power takeoff as defined in claim 1, said resilient mounting of said annular member on said hub comprising rubber O-rings interposed between the external surface of said hub and the internal surface of said annular member.

4. A power takeoff as defined in claim 1, said unit of accessory equipment comprising a hydraulic pump.

5. A power takeoff as defined in claim 1 including an axial guide pin on said sleeve, and an axial bore in said first housing slidably receiving said guide pin to prevent rotation of said sleeve.

6. A power takeoff as defined in claim 1, said first universal joint connection comprising a circle of axial pins on said one end of said annular member loosely engaged in a circle of axial holes in said hub, and said second universal joint connection comprising a circle of axial pins on said driving member loosely engaged in a circle of axial holes in said opposite end of said annular member, sliding movement of said sleeve away from said driving member separating said last holes from said last pins to disengage said clutch.

7. A power takeoff for an engine comprising a housing adapted for mounting on an engine housing, a sleeve mounted for sliding movement in said first housing, an axial bore in said first housing outside of said sleeve, an axial guide pin on said sleeve slidable in said bore to prevent rotation of said sleeve, means for mounting on said sleeve a unit of accessory equipment having a shaft, a hub on said shaft, a pair of resilient rubber O-rings on said hub, an annular member mounted on said O-rings, a circle of axial pins on one end of said annular member loosely engaged in a circle of axial holes in said hub, a driving member adapted for connection with a camshaft gear in said engine, and a circle of axial pins on said driving member loosely engaged in a circle of axial holes in the opposite end of said annular member, sliding movement of said sleeve away from said driving member separating said last holes from said last pins to disconnect said annular member and said hub from said driving member.

* * * * *